United States Patent
Yao et al.

(10) Patent No.: US 11,267,764 B2
(45) Date of Patent: Mar. 8, 2022

(54) KR DESULFURIZATION STIRRING PADDLE CASTING MATERIAL AND PREPARATION METHOD THEREFOR

(71) Applicant: BAOSHAN IRON & STEEL CO., LTD., Shanghai (CN)

(72) Inventors: Jingfu Yao, Shanghai (CN); Feifang Gan, Shanghai (CN); Jining Mou, Shanghai (CN); Tao Wang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 36 days.

(21) Appl. No.: 16/649,395

(22) PCT Filed: Sep. 7, 2018

(86) PCT No.: PCT/CN2018/104508
§ 371 (c)(1),
(2) Date: Mar. 20, 2020

(87) PCT Pub. No.: WO2019/056952
PCT Pub. Date: Mar. 28, 2019

(65) Prior Publication Data
US 2020/0308065 A1    Oct. 1, 2020

(30) Foreign Application Priority Data
Sep. 21, 2017 (CN) .......................... 201710861888.1

(51) Int. Cl.
*C04B 35/76* (2006.01)
*C21C 1/02* (2006.01)

(52) U.S. Cl.
CPC ............ *C04B 35/76* (2013.01); *C21C 1/02* (2013.01); *C04B 2235/3217* (2013.01); *C04B 2235/3222* (2013.01); *C04B 2235/349* (2013.01); *C04B 2235/3418* (2013.01); *C04B 2235/3463* (2013.01); *C04B 2235/5216* (2013.01); *C04B 2235/5436* (2013.01); *C04B 2235/9676* (2013.01)

(58) Field of Classification Search
CPC ............ C04B 35/76; C04B 2235/3217; C04B 2235/3222; C04B 2235/3418; C04B 2235/3463; C04B 2235/349; C04B 2235/5216; C04B 2235/5436; C04B 2235/9676; C21C 1/02
See application file for complete search history.

(56) References Cited

FOREIGN PATENT DOCUMENTS

| CN | 1 785 908 A | 6/2006 |
|---|---|---|
| CN | 101805198 | 8/2010 |
| CN | 101857446 A | 10/2010 |
| CN | 102424878 | 4/2012 |
| CN | 102746006 | 10/2012 |
| CN | 103 172 393 A | 6/2013 |
| CN | 103588491 | 2/2014 |
| CN | 104 311 042 A | 1/2015 |
| CN | 104311042 | 1/2015 |
| CN | 104311042 * | 8/2016 |
| CN | 106518035 A | 3/2017 |
| CN | 107141002 | 9/2017 |
| JP | 2009091204 A | 4/2009 |

OTHER PUBLICATIONS

CN104311042 machine translation (Year: 2016).*
CN104311042 machine translation via Google Patents (Year: 2016).*
European Patent Office Communication—EP Supplemental Search Report, dated Dec. 16, 2020.
(Continued)

*Primary Examiner* — Karl E Group
*Assistant Examiner* — Cameron K Miller
(74) *Attorney, Agent, or Firm* — Lei Fang; Smith Tempel Blaha LLC

(57) ABSTRACT

Provided are a Kanbara Reactor (KR) desulfurization stirring paddle casting material and a preparation method therefor. The casting material consists of a base material and an additive; the base material consists of the following raw materials in weight percentages: M70 sintered mullite 60-80%, flint clay 5-20%, fine powder 5-20%, and pure calcium aluminate cement 1-5%. The percentages of each component of the additive based on the weight of the base material are as follows: water reducing agent 0.05-0.2%, and heat-resistant stainless steel fiber 1-5%. The main raw materials are M70 sintered mullite and a small amount of flint clay so as to ensure good thermal shock resistance; the medium temperature and high temperature strength are controlled at 100-180 MPa so as to ensure good erosion resistance; the content of $Al_2O_3$ in the casting material is 60-70% so as to ensure good corrosion resistance; the ratio of high temperature strength to medium temperature strength is controlled at 1-1.2, which further improves the thermal shock resistance and peeling resistance of the casting material, thereby extending the service life of the stirring paddle. The casting material is lower in cost and has a good practical furnace usage effect; in addition, a paddle blade has less chance of cracking and peeling, while a bottom portion of the stirring paddle is less eroded, thus the frequency of paddle blade repair is low, and service life is significantly improved.

12 Claims, No Drawings

(56) References Cited

OTHER PUBLICATIONS

Xiang, Qian, et al. (2009) "Effect of Aggregates on the Properties of Outer Lining of KR Desulphurization Stirring Device." Bulletin of the Chinese Ceramic Society : S1.
International Search Report and Written Opinion dated Nov. 27, 2018 for PCT Patent Application No. PCT/CN2018/104508.
Office Action dated Mar. 23, 2021 for Japanese Patent Application No. 2020-516629.

* cited by examiner

KR DESULFURIZATION STIRRING PADDLE CASTING MATERIAL AND PREPARATION METHOD THEREFOR

CROSS-REFERENCE TO RELATED APPLICATIONS

This application is a 371 U.S. National Phase of PCT International Application No. PCT/CN2018/104508 filed on Sep. 7, 2018, which claims benefit and priority to Chinese patent application no. 201710861888.1 filed on Sep. 21, 2017. Both of the above-referenced applications are incorporated by reference herein in their entireties.

TECHNICAL FIELD

The present disclosure relates to the field of molten iron desulfurization, in particular to a casting material for a stirring paddle for desulfurization and a preparation method thereof.

BACKGROUND ART

The KR stirring desulfurization process is a technology for desulfurization of molten iron outside a furnace, initially explored by Hirohata Steel Works, Nippon Steel in 1963 and applied to industrial production in 1965. According to this desulfurization process, a stirring paddle coated with a refractory material is immersed in a molten iron tank to rotate and stir molten iron, so that the molten iron generates a vortex. A weighed desulfurizing agent is added from a feeder to the surface of the molten iron and drawn into the molten iron by the vortex. The desulfurizing agent is mixed and reacted with the high temperature molten iron to fulfill the purpose of desulfurization. The KR desulfurization process has the characteristics of high desulfurization efficiency, low desulfurizing agent consumption, short operation time, low metal loss and low refractory material consumption, etc. Many steel mills are increasingly adopting the KR desulfurization process.

A stirring paddle, consisting of a rotating shaft and cross blades, is an important part of a KR desulfurization device. As such, the stirring paddle is also called a stirrer or a stirring head. The core of the stirring paddle is formed by casting a metal material, and the working coating is integrally cast from a refractory casting material. Generally, the stirring paddle comprises 4 blades, and the steel structure also comprises 4 blades. Anchoring parts are provided on the surface of the steel structure.

After the occurrence of the KR stirring desulfurization process, its promotion and application were slow at the beginning, mainly due to the short service life of the stirring paddle, which impeded the development of the desulfurization process. Through long-term application and research, the service life of the stirring paddle has been extended greatly. In order to advance the KR stirring desulfurization process and reduce the desulfurization cost, it is a perpetual task to continuously increase the service life of the stirring paddle.

In the prior art, CN101857446A discloses an invention entitled "Desulfurization Stirring Paddle Casting Material", wherein the material comprises 26-33% sintered zirconia mullite, 26-35% common electro-fused mullite, 5-9% flint clay, 4-7% kyanite, 5-10% special grade bauxite clinker, 3-5% silica micropowder, 3-5% α-$Al_2O_3$ micropowder, 5-8% ρ-$Al_2O_3$, 1.5-3.5% pure calcium aluminate cement, 1.5-3.5% dense corundum fine powder. This invention uses sintered zirconia mullite and dense corundum fine powder, leading to high cost. Due to the addition of kyanite, the casting material swells greatly, which is disadvantageous to thermal shock resistance. The use of special grade bauxite clinker and dense corundum fine powder is undesirable for thermal shock resistance. CN200510019721.8 discloses an invention entitled "Refractory Casting Material for Stirrers for Molten Iron Desulfurization". In addition to electro-fused mullite and flint clay, kyanite, special grade alumina and dense corundum fine powder are also added. The latter three components have the same disadvantages as the previous invention. CN101337821A discloses an invention entitled "Low Density Refractory Casting Material for KR Stirring Paddles". The particles comprise special grade flint clay, silica and silicon carbide as the principal raw materials and the casting material also comprises alumina powder of less than 0.074 mm, silicon carbide, silica micropowder, and alumina cement. Although the flint clay and silica in the principal raw materials of this invention have low densities, the erosion resistance is not good. As one of the principal raw materials, silicon carbide is not only costly, but also disadvantageous to thermal shock resistance. CN104311071A discloses an invention entitled "Refractory Casting Material for Stirrers for Molten Iron Desulfurization", wherein the material comprises 30-35 parts of silica, 20-25 parts of silicon carbide, 30-40 parts of magnesia fine powder, 40-45 parts of alumina fine powder, and 20-25 parts of magnesia-alumina spinel. Among them, the disadvantages of silica and silicon carbide have been noted above. Magnesia fine powder and magnesia-alumina spinel swell greatly. Magnesia fine powder and alumina fine powder react at high temperatures to form spinel which also swells. The main disadvantage is that the casting material swells greatly at high temperatures, and has poor thermal shock resistance and spalling resistance. CN201310059252.7 discloses an invention entitled "Casting Production Process of Stirring Paddles for Desulfurization of Molten Steel in Converter". Electro-fused mullite, white corundum, silicon carbide and andalusite are used as raw materials. The disadvantages of silicon carbide have been noted above. The addition of white corundum is disadvantageous to thermal shock resistance, and white corundum is costly.

SUMMARY

As studies show, a stirring paddle is used intermittently, which requires that the casting material should have good thermal shock resistance; the stirring paddle rotates at high speed in high temperature molten iron, and is subject to scouring and abrasion of the molten iron, which requires that the casting material should have good scouring resistance; and the desulfurizing agent is a lime containing a certain amount of fluorite which has an erosive effect on the casting material, which requires that the casting material should have good erosion resistance.

As observed in use, a stirring paddle is damaged mainly in three ways:

1) the stirring paddle cracks, the cracks propagate, and local spalling occurs;

2) the blade becomes smaller due to scouring, abrasion and erosion of high temperature molten iron and slag; and 3) due to expansion of the steel structure, the stirring paddle is stretched longitudinally, resulting in a bamboo-like depression, such that a transverse crack generally forms in the middle of the blade, which becomes a vulnerable spot where the molten iron may penetrate easily.

A stirring paddle is removed from a production line mainly in two cases. In the first one, the cracking and spalling of the blade are very serious, and continued use may lead to burnthrough of the steel structure. In the second one, the blade is abraded and eroded seriously, and the remaining thickness of the casting material is so small that the desired desulfurization effect cannot be achieved by stirring.

Therefore, in view of the use characteristics of the stirring paddle, the thermal shock resistance, scouring resistance and erosion resistance of the casting material must be taken into account at the same time.

In order to achieve the above technical objectives, the present disclosure provides a casting material for a stirring paddle for KR desulfurization and a preparation method thereof, whereby the comprehensive performances of the casting material for the stirring paddle are modified and improved. Particularly, the casting material has both superior thermal shock resistance and good resistance to scouring from molten steel and erosion from a desulfurizing agent, thereby extending the service life of the stirring paddle.

The technical solution of the present disclosure is described as follows:

A casting material for a stirring paddle for KR desulfurization, consisting of a base material of the casting material and additives, wherein the base material of the casting material consists of the following ingredients by weight percentage: 60-80% of M70 sintered mullite, 5-20% of flint clay, 5-20% of micropowder, and 1-5% of pure calcium aluminate cement;

wherein the additives comprise the following ingredients by weight percentage based on the weight of the base material of the casting material: 0.05-0.2% of a water reducing agent, and 1-5% of a heat-resistant stainless steel fiber.

Preferably, the base material of the casting material comprises 60-70% by weight of $Al_2O_3$ according to the present disclosure.

In the present disclosure, the principal ingredient is M70 sintered mullite (the content of $Al_2O_3$ in M70 sintered mullite being 70% or more) which accounts for 60% or more by weight of the base material of the casting material, so as to guarantee good thermal shock resistance; the medium temperature strength and high temperature strength are controlled at 100-180 MPa, so as to guarantee good resistance to scouring from molten steel; and the $Al_2O_3$ content of the casting material is 60-70%, so as to guarantee good erosion resistance. The ratio of the high temperature strength to the medium temperature strength is controlled at 1-1.2 to further improve the thermal shock resistance of the casting material.

The flint clay is preferably flint clay having an $Al_2O_3$ content of 43% or more.

The micropowder is a silica micropowder (having a $SiO_2$ content of 92% or more and a particle size of ≤1 µm) and/or an alumina micropowder (having an $Al_2O_3$ content of 99% or more and a particle size of ≤3 µm).

The pure calcium aluminate cement is preferably pure calcium aluminate cement having an $Al_2O_3$ content of 70% or more.

The heat-resistant stainless steel fiber may be 446# heat-resistant stainless steel fiber, etc.

In the prior art, bauxite clinker, andalusite, kyanite, and SiC are often added in addition to mullite. The present inventors have contemplated that, despite the high $Al_2O_3$ content of the stirring paddle imparted by the addition of bauxite clinker, the casting material containing bauxite clinker has poor thermal shock resistance. When heat-resistant stainless steel fiber is added, the casting material exhibits expansion characteristic at high temperatures. If kyanite and andalusite are further added, the casting material expands more seriously, unfavorable for thermal shock resistance. Addition of silicon carbide is favorable for resistance to scouring due to the good abrasion resistance of SiC, but experimental studies show that the addition of silicon carbide significantly degrades the thermal shock resistance of the casting material. In addition, the thermal conductivity coefficient of SiC is very high, and thus the heat of the high temperature molten iron may be conducted easily to the inner steel structure when the paddle is used, so that the temperature of the steel structure will be high, and the steel structure will expand greatly. Especially in the middle to late service life of the stirring paddle, the blade becomes smaller due to erosion, and thus the temperature of the inner steel structure becomes higher. Large expansion of the steel structure tends to crack the casting material. In addition, silicon carbide is disadvantageous to sintering of the casting material, and the raw material of silicon carbide is costly.

According to the present disclosure, if the content of M70 sintered mullite is lower than 60%, it will be disadvantageous to thermal shock resistance. If the strength is less than 100 MPa, the casting material will have insufficient resistance to scouring; and if it is higher than 180 MPa, the strength will be too high to be conducive to thermal shock resistance. If the $Al_2O_3$ content of the casting material is less than 60%, the erosion resistance will be insufficient; and if it is higher than 70%, the sintered mullite content will be insufficient, disadvantageous to thermal shock resistance. If the ratio of high temperature strength to medium temperature strength is less than 1, it indicates that the high temperature sintering strength of the casting material is insufficient, which is unfavorable for scouring resistance; and if it is higher than 1.2, there will be an unduly large difference between the high temperature strength and the medium temperature strength, which is unfavorable for thermal shock resistance and spalling resistance.

The present disclosure also provides a method for preparing the casting material for a stirring paddle for KR desulfurization, comprising: weighing the base material of the casting material and the additives according to the proportions, and mixing uniformly.

Beneficial Effects

The present disclosure improves the comprehensive performances of the casting material for a stirring paddle. Particularly, it has both superior thermal shock resistance, and good resistance to scouring from molten steel and erosion from a desulfurizing agent, helpful for extending the service life of the stirring paddle.

DETAILED DESCRIPTION

The ingredients in the proportions as shown in Table 1 were weighed to obtain the base materials for the casting materials of Examples 1-3 and Comparative Examples 1-5; and then 0.12% of a water-reducing agent (sodium tripolyphosphate) and 3% of 446# heat-resistant stainless steel fiber based on the base materials for the casting materials were added to Examples 1-3 and Comparative Examples 1-5, respectively. After uniform mixing, the casting materials for stirring paddles for KR desulfurization in Examples 1-3 and Comparative Examples 1-5 were obtained, respectively.

TABLE 1

Proportions of the ingredients of the base materials for the casting materials (wt %)

| Ingredient | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| M70 sintered mullite | 72 | 79 | 75 | 58.5 | 40 | 50 | 62 | 50 |
| Flint clay | 15 | 8 | 10 | 10 | 30 | / | 10 | 10 |
| Specail grade bauxite | / | / | / | 10 | / | 25 | / | 10 |
| SiC | / | / | / | / | 5 | / | 8 | / |
| Andalusite | / | / | / | 10 | 10 | 10 | 10 | 10 |
| Kyanite | / | / | / | 3.5 | 3.5 | 3.5 | 3.5 | 3.5 |
| Micropowder | 10 | 10 | 12.5 | 5 | 8 | 8 | 8 | 13 |
| Pure calcium aluminate cement | 3 | 3 | 2.5 | 3 | 3.5 | 3.5 | 3.5 | 3.5 |

In Table 1,

M70 sintered mullite has an $Al_2O_3$ content of about 70%.

Flint clay has an $Al_2O_3$ content of about 43%.

The micropowder is a blend of silica micropowder (having a $SiO_2$ content of about 92% and a particle size of 1 μm) and alumina micropowder (having a $Al_2O_3$ content of about 99% and a particle size of 3 μm) in a mass ratio of 1:1.

Pure calcium aluminate cement has an $Al_2O_3$ content of about 70%.

The heat-resistant stainless steel fiber may be 446 # heat-resistant stainless steel fiber, etc.

In the present disclosure, the $Al_2O_3$ content refers to the weight percentage of $Al_2O_3$.

Performance tests were performed on the casting materials of Examples 1-3 and Comparative Examples 1-5 for stirring paddles for KR desulfurization. The test results are shown in Table 2.

the medium temperature strength and high temperature strength of Comparative Example 1 were relatively low. The erosion resistance of Comparative Example 2 was poor due to the addition of a relatively large amount of flint clay. The thermal shock resistance of Comparative Example 3 was poor due to a relatively large content of special grade bauxite. Because Comparative Example 4 contained a relatively large amount of SiC, its thermal shock resistance was poor. Due to the unduly large strength ratio, the thermal shock resistance of Comparative Example 5 was also poor.

Examples 1-3 according to the present disclosure improved the comprehensive performances of the casting materials for stirring paddles. Particularly, they had both superior thermal shock resistance, and good resistance to scouring from molten steel and erosion from the desulfurizing agent, thus helpful for extending the service life of the stirring paddles.

TABLE 2

Performance test results of casting materials

| Test item | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| $Al_2O_3$ content in casting material | 65.3% | 68.2% | 66.9% | 66.5% | 56.2% | 71.3% | 62.8% | 67.9% |
| Medium temperature strength, MPa | 124.4 | 135.6 | 158.2 | 83.5 | 131.7 | 132.0 | 156.4 | 132.0 |
| High temperature strength, MPa | 118.5 | 144.1 | 173.5 | 89.1 | 138.3 | 149.8 | 149.1 | 190.1 |
| Strength ratio | 0.95 | 1.06 | 1.10 | 1.07 | 1.05 | 1.14 | 0.95 | 1.44 |
| Thermal shock resistance, water cooling for 35 times | Few small cracks | Few small cracks | Few small cracks | More small cracks | More small cracks | More large cracks | More large cracks, few spallings | More large cracks, few spallings |
| Erosion resistance index | 104 | 100 | 103 | 106 | 118 | 106 | 101 | 105 |

Table 2 lists the performances of the Examples and Comparative Examples. The intermediate temperature strength and high temperature strength are compressive strength after firing at 1000° C. for 3 hours (inspection standard GB/T 5072.1-1998) and compressive strength after firing at 1400° C. for 3 hours, respectively. The strength ratio is a ratio of the compressive strength after firing at 1400° C. for 3 hours to the compressive strength after firing at 1000° C. for 3 hours. The thermal shock resistance (inspection standard YB/T 2206.2-1998) is determined by observing the cracking of a sample after water cooling from 1100° C. for 35 times. The erosion resistance index is based on Example 2. The larger the value, the worse the erosion resistance.

It can be seen that the comprehensive performances of the Examples were better. Among the Comparative Examples, The effects of Example 2 in use are compared with that of Comparative Example 2. The results are shown in Table 3.

TABLE 3

Effects in use in real furnaces

| Item | Ex. 2 | Comp. Ex. 2 |
|---|---|---|
| Cost of casting material | 8% lower | / |
| Cracking and spalling of blade | Little | More |
| Bottom erosion of stirring paddle | Little | More |

TABLE 3-continued

Effects in use in real furnaces

| Item | Ex. 2 | Comp. Ex. 2 |
|---|---|---|
| Frequency of blade repair | Low | High |
| Service life of stirring paddle | Increased by 12% | / |

Compared with Comparative Example 2, the cost of the casting material of Example 2 was reduced by 8%, and the service life of the stirring paddle was increased by 12%.

What is claimed is:

1. A casting material for a stirring paddle for KR desulfurization, consisting of a base material of the casting material and additives,
   wherein the base material of the casting material consists of the following ingredients by weight percentage: 60-80% of M70 sintered mullite, 5-20% of flint clay, 5-20% of micropowder, and 1-5% of pure calcium aluminate cement; and
   wherein the additives consist of, by weight percentage based on the weight of the base material of the casting material: 0.05-0.2% of a water reducing agent, and 1-5% of a heat-resistant stainless steel fiber.

2. The casting material for a stirring paddle for KR desulfurization according to claim 1, wherein the base material for the casting material has an $Al_2O_3$ content of 60-70%.

3. The casting material for a stirring paddle for KR desulfurization according to claim 1, wherein the M70 sintered mullite has an $Al_2O_3$ content of 70% or more.

4. The casting material for a stirring paddle for KR desulfurization according to claim 1, wherein the flint clay has an $Al_2O_3$ content of 43% or more.

5. The casting material for a stirring paddle for KR desulfurization according to claim 1, wherein the micropowder is a silica micropowder and/or an alumina micropowder.

6. The casting material for a stirring paddle for KR desulfurization according to claim 1, wherein the pure calcium aluminate cement has an $Al_2O_3$ content of 70% or more.

7. A method for preparing the casting material for a stirring paddle for KR desulfurization according to claim 1 comprising: weighing the base material of the casting material and the additives according to the proportions, and mixing uniformly.

8. The method according to claim 7, wherein the base material for the casting material has an $Al_2O_3$ content of 60-70%.

9. The method according to claim 7, wherein the M70 sintered mullite has an $Al_2O_3$ content of 70% or more.

10. The method according to claim 7, wherein the flint clay has an $Al_2O_3$ content of 43% or more.

11. The method according to claim 7, wherein the micropowder is a silica micropowder and/or an alumina micropowder.

12. The method according to claim 7, wherein the pure calcium aluminate cement has an $Al_2O_3$ content of 70% or more.

* * * * *